TAPE DRIVE

Filed June 25, 1958 2 Sheets-Sheet 1

*INVENTORS*
HEARD K. BAUMEISTER
LOUIS B. FEIERABEND

BY Geoffrey Knight
ATTORNEY

Oct. 4, 1960 H. K. BAUMEISTER ET AL 2,954,911

TAPE DRIVE

Filed June 25, 1958 2 Sheets-Sheet 2

United States Patent Office 2,954,911
Patented Oct. 4, 1960

2,954,911

TAPE DRIVE

Heard K. Baumeister, Verbank, and Louis B. Feierabend, Poughkeepsie, N.Y., assignors to International Business Machines Corporation, New York, N.Y., a corporation of New York Filed June 25, 1958, Ser. No. 744,594

5 Claims. (Cl. 226—95)

This invention relates generally to improved means for driving strip material, such as magnetic tape, at high speeds with provision for quick starting and stopping of the tape, and particularly to an improved system of pneumatic capstans in such a tape drive.

Suction clutching of tape to one of two counter-rotating drive capstans is a known method of starting and driving tape. Tape drives in the prior art have operated by applying pressure air lubrication to the reverse capstan and vacuum to the drive capstan, controlling pressure and vacuum by valves external to the capstan. The reaction of such pneumatic capstans, in the transition from pressure to vacuum phase, though very fast, is not instantaneous.

It is therefore an object of the invention to decrease time lost in the transition from the pressure to the vacuum phase, by placing the valve inside the capstan as close as possible to the operating surface.

It is a further object to provide novel means for distributing and equalizing the supply of suction and pressure to the operating surface of the capstan, to prevent skew or loss of control over the tape.

Another object is to provide novel valve means within the capstan itself for providing an instantaneous transition from the pressure-idle phase to the vacuum-drive phase and back.

Another object is to provide a tape drive that fails safe, without damage to the tape.

Other objects of the invention will be pointed out in the following description and claims and illustrated in the accompanying drawings, which disclose, by way of example, the principle of the invention and the best mode which has been contemplated of applying that principle.

Figure 1:
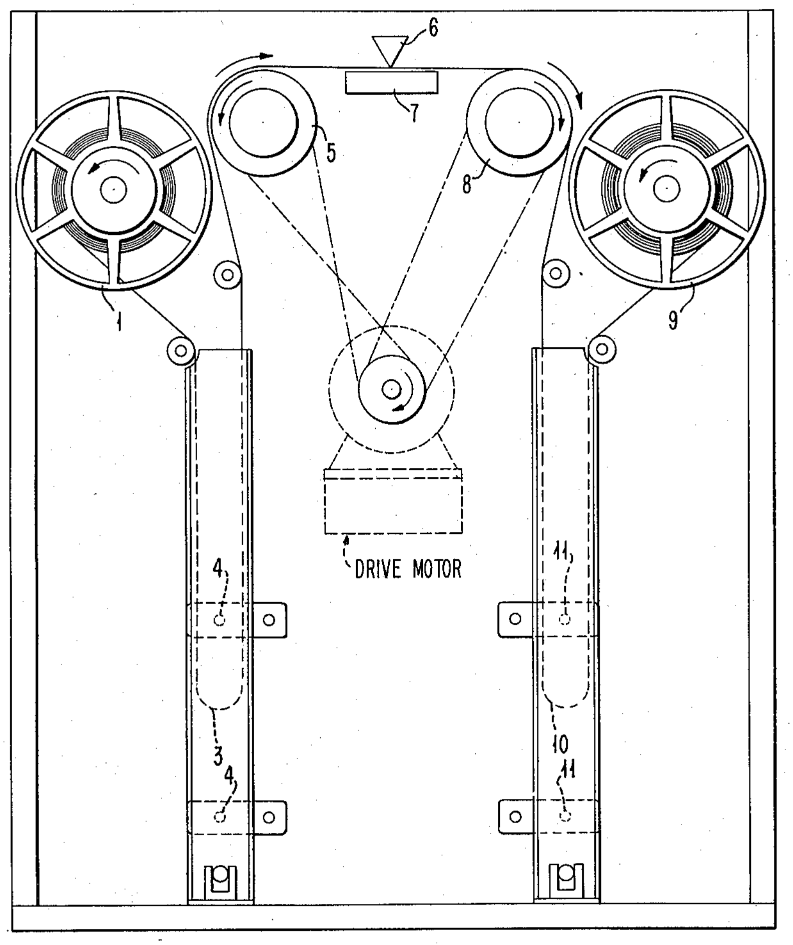
Fig. 1 is a diagram of the entire tape drive.

The general operation of a tape drive is well known in the art, and is fully described in Patent No. 2,792,217, issued May 14, 1957, to J. A. Weidenhammer et al., entitled, "Tape Feed Mechanism." A supply reel 1, Fig. 1, is mounted on a reel drive motor shaft, not shown. Tape 2 is fed to a loop 3 in a vacuum column which loop is measured by sensing elements 4, which in turn control the reel-drive motor to keep the loop constant.

The tape then slides over the reverse capstan 5 which is rotating in the rewinding direction, past the read-write head 6, and a suitable tape brake 7 to the drive capstan 8.

The drive capstan rotates in the forward direction at operational speeds, and the tape may be held tightly to the drive capstan by suitable means. The tape is collected from the drive capstan by a take-up reel 9 fed by a loop 10 in a vacuum column, which loop is measured by a sensing element 11 and held constant by a reel-drive motor, not shown, driving the take-up reel.

Figure 2:
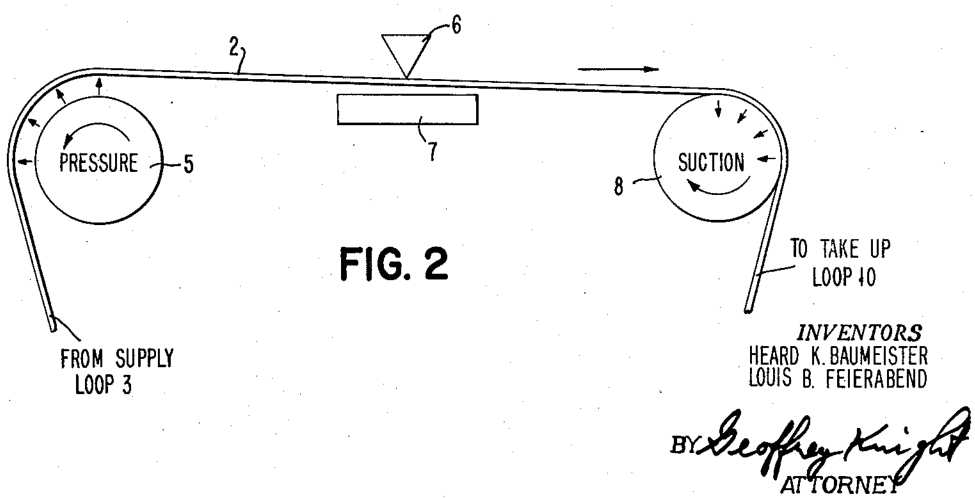
Fig. 2 is an enlarged diagram of the tape driving capstans showing operation as the tape is driven in the forward direction.

The invention resides in the means for driving tape from the supply loop, past the read-write head to the take-up loop. Tape from the supply loop 3 (Fig. 2) slides over the reverse capstan 5, which is continuously rotating in the reverse direction, on a cushion of air passing out of apertures in the surface of the reverse capstan. The tape passes the read-write head, and is drawn into engagement by means of an instantaneous tape-contacting arc of the drive capstan by atmospheric pressure, because of the suction supplied to apertures in the instantaneous tape-contacting surface of the drive capstan 8. Friction with the surface of the drive capstan causes the tape to move to the take-up loop 10.

To stop the tape, the drive capstan is transferred from the suction to the pressure phase. Air under pressure pushes the tape away from the capstan, and maintains a pad to allow the capstan to rotate freely under the stationary tape. At the same time that pressure is applied to the capstan, the brake 7, such as a suction brake, is applied—the tape stops because of the brake and because both capstans are in the pressure phase and provide no drive friction.

Reversal is accomplished by releasing the brake and transferring the reverse capstan to the suction phase. Reversing may be done without stopping the tape except momentarily, and the brake need not be used.

Figures 3, 4, 5:
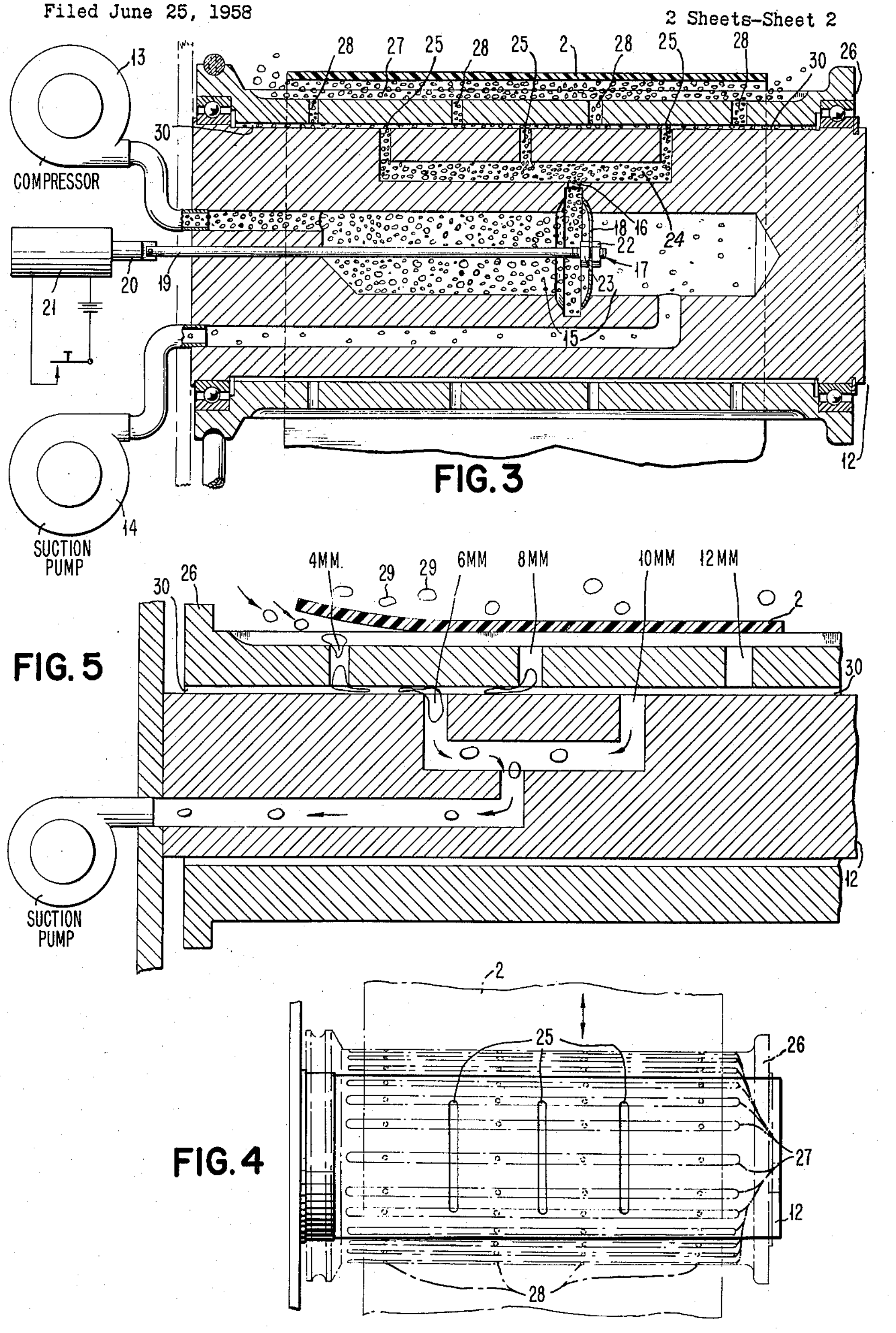
Fig. 3 is a semi-diagrammatic side elevation view of a vertical section of a capstan.
Fig. 4 is a top plan view of a capstan with the external spool and tape shown in phantom.
Fig. 5 is a simplified diagrammatic view of a vertical section of a capstan, showing the path of air particles.

The capstans may be identical except for the direction of constant rotation. Each comprises a central non-rotatable hub 12 (Fig. 3) designed to conduct operating air from a supply of air under pressure 13, and to a supply of suction 14 to a centrally located cavity 15 with an outlet 16. A poppet valve 17, consisting of a thin, resilient metal disk 18 within the cavity, and a slender stem 19 extending out of the hub to a solenoid plunger 20, divides cavity 15 into a pressure section and vacuum section, and is operated under control of a solenoid 21 to allow either pressure or suction to the cavity outlet 16, by altering the dimensions of the sections to include or to exclude the outlet 16. The valve stem 19 is composed of lightweight material and may be threaded at the disk end to coact with threaded nuts 22—23 to hold the valve disk 18 in place. The disk is thin and resilient and is composed of spring steel or other suitable material which can withstand the shock of fast operation against the seats. The resiliency of the disk allows it to conform to the curvature of the seat for a more positive seal, without binding. This valve is normally held in the position shown in Fig. 3, by the pressure and vacuum which return the disk to the right in Fig. 3. Should there be a failure in the electrical circuit to the solenoid, the valve returns to normal and the tape is blown away from the capstan. In other words, the valve fails safe. The cavity outlet, which is located near the midline of the tape, connects to a longitudinal duct 24 with a row of circumferentially extending slots 25 connecting the pneumatic supply to that portion of the stationary hub which corresponds to the tape contacting surface of the capstan. The slots are preferably elongated to provide for an ascertainable arc of contact between capstan and tape, but may be replaced by other configurations such as simple holes.

The cylindrical spool 26 (Figs. 3 and 4) of the capstan, which encloses the non-rotatable hub and cavity, may have a row of grooves 27 around its periphery to provide for tape gripping. Most of the grooves have ports 28 cut through the spool, to carry the pneumatic supply. These ports may operate without the grooves if desired.

The connecting ports 28 do not make contact with any of the slots 25 in the hub, since they are deliberately positioned in a staggered relationship. The pneumatic supply of operating air must pass through the small effective area of opening of operating clearance 30 between the stationary hub 12 and the rotating capstan spool 26, the operating clearance being small enough to act as a ballast. This ballast, or impedance to flow of operating air overcomes the effect of curling of the tape at the operating surface, and the consequent loss of control of the tape. The effective area of the operating clearance opening is less than the effective port area of opening and the effective slot area of opening. The clearance impedance is greater than the combined port impedance and slot impedance. For example, in a simplified embodiment shown diagrammatically in Fig. 5, where there are three ports ranged at 4 mm. intervals on a capstan for 16 mm. tape, at points 4 mm., 8 mm. and 12 mm., these might be two slots connecting with the duct at points 6 mm. and 10 mm. Slot 6 mm. operates port 4 mm., and helps with port 8 mm. It has little effect on port 12 mm. If the tape should curl at port 2 mm. and air particles 29 rush in, eliminating part of the suction in the small operating clearance, the particles must expand within slot 6 mm. before they can alter the suction at port 8 mm. Port 8 mm. is held under suction by slot 10 mm. The expansion chamber formed by the slot makes recovery quicker than if the inrushing air had to be pumped through the duct to the suction pump, with the corresponding friction loss.

This principle also applies in the pressure phase to equalize pressure in the air bearing under the tape. The manifolding system also cools the capstan shell by the air bearing formed between the stationary hub and the shell.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a tape drive, a pneumatic capstan comprising a peripheral rotatable spool having an operating surface for contacting the tape at an instantaneous operating area, a central non-rotatable hub having a cavity lying under said tape-contacting surface, an externally controllable poppet valve internal to said hub and spool and bisecting said cavity into a pressure section and a vacuum section, means for supplying pneumatic pressure and suction to respective sections of said cavity, and duct means opening into said cavity at the point where said valve bisects said cavity, to apply selectively pressure or suction through said spool to the instantaneous operating area of said operating surface.

2. In a tape drive: a pneumatic capstan including a peripheral rotatable spool having a tape-contacting surface; a central non-rotatable hub having a cavity substantially enclosed by said rotatable spool; means for supplying air under pressure to one portion of said cavity; a valve consisting of a thin, resilient valve disk on a slender stem, said valve disk separating said cavity into a pressure section and a vacuum section and said stem extending out of said cavity; a solenoid with its plunger operably connected to said stem; duct means for carrying pneumatic fluid between said cavity and said rotatable spool, having an opening into said cavity substantially centrally located with respect to the tape-contacting surface; said valve disk having a normal position dividing said cavity in such manner that said opening is in said pressure section of said cavity, said valve disk being so held by the pneumatic pressure against it; said valve disk, when said solenoid is energized, being moved to a position which places said opening in aforesaid vacuum section of said cavity; and said valve disk, upon termination of the energization of said solenoid, being urged toward said normal position by the pneumatic pressure against it.

3. In apparatus to feed tape at high speed, by selective engagement with a continuously-rotatable capstan at an instantaneous tape-engaging peripheral area under control of applied pneumatic suction for the drive phase or pneumatic pressure for the stop or reverse phases: a central non-rotatable hub with a central cavity, air pressure supply means connected by a duct to said central cavity, suction supply means connected by a duct to said central cavity, a longitudinal pneumatic duct, an outlet from said central cavity into said pneumatic duct, a plurality of slots arranged in a longitudinal row along the portion of said hub adjacent to the operating surface of said capstan, opening into said duct, a peripheral rotatable capstan spool mounted on said hub with a small operating clearance, said capstan spool having its peripheral surface marked by a plurality of ports cut through the capstan spool, said ports being arranged in staggered relationship with said slots to make pneumatic connection with said slots only indirectly, through said small operating clearance, and an externally controllable poppet valve, internal to said capstan cavity, arranged to divide said cavity in such manner as to connect selectively vacuum for the drive phase of said capstan, or pressure to disengage the capstan from the tape and provide lubrication in the stop or reverse phases.

4. In apparatus to feed tape at high speed, by selective engagement with a continuously-rotatable capstan at an instantaneous tape-engaging peripheral area under control of applied pneumatic suction for the drive phase or pneumatic pressure for the stop or reverse phases: a central non-rotatable hub with a central cavity, air pressure supply means connected by a duct to said central cavity, suction supply means connected by a duct to said central cavity, a longitudinal pneumatic duct, an outlet from said central cavity into said pneumatic duct, a plurality of slots arranged in a longitudinal row along the portion of said hub adjacent to the operating surface of said capstan, opening into said duct, a peripheral rotatable capstan spool mounted on said hub with a small operating clearance, said capstan spool having its peripheral surface marked by a plurality of ports cut through the capstan spool, said ports being arranged in staggered relationship with said slots to make pneumatic connection with said slots only indirectly, through said small operating clearance, and an externally controllable poppet valve comprising a slender stem extending from an external control means, through said stationary hub into said cavity, with a resilient disk arranged to block vacuum from said cavity outlet in the normal position, while allowing air pressure to escape, and arranged to block air pressure from said cavity outlet in the operated position, while opening said outlet to vacuum.

5. A pneumatic element for carrying tape, consisting of an essentially cylindrical hub having longitudinally extending air duct means for conduction of operating air; a peripheral rotatable spool mounted on said hub, said spool having an exterior surface for contacting the tape at an instantaneous tape-contacting arc, said spool having an interior diameter slightly greater than the diameter of said hub to maintain a small operating clearance between said hub and said spool, providing at the instantaneous tape-contacting arc of said spool an instantaneous clearance area of opening sufficient to impede without preventing flow of operating air between said hub and said spool by presenting a finite operating clearance impedance; a multiplicity of ports arranged about the periphery of said spool to conduct operating air through said spool, the number and dimensions of said ports instantaneously positionable within the instantaneous tape-contacting arc being maintained to provide a large port area of opening for passing operating air subject to a low port impedance; a row of circumferentially extending slots arranged longitudinally along said hub between said duct means and the surface of said hub, said row of slots defining the instantaneous tape-contacting arc, said slots being staggered with respect to said ports to require passage of operating air through said operating clearance, the number and dimensions of said slots being maintained to provide a large slot area of opening to pass operating air subject to a low slot impedance; the dimensional relationships being maintained in said operating clearance, ports and slots such that the clearance area of opening is smaller than either the port area of opening or the slot area of opening, and the clearance impedance to operating air is greater than the sum of the port impedance and the slot impedance to provide effective control of the distribution of operating air to the instantaneous tape-contacting arc of said spool, whereby, in providing ballast to the operating air path between said ports and said slots, the operating clearance, through dimension control, is effective to perform an affirmative function.

References Cited in the file of this patent

UNITED STATES PATENTS

| | | |
|---|---|---|
| 2,730,360 | Heywood | Jan. 10, 1956 |
| 2,741,264 | Leonard | Apr. 10, 1956 |
| 2,753,181 | Anander | July 3, 1956 |
| 2,778,634 | Gams et al. | Jan. 22, 1957 |
| 2,837,330 | Lawrence et al. | June 3, 1958 |

FOREIGN PATENTS

| | | |
|---|---|---|
| 1,211 | Switzerland | July 18, 1889 |